(12) United States Patent
Hamilton, II et al.

(10) Patent No.: US 8,441,475 B2
(45) Date of Patent: May 14, 2013

(54) ARRANGEMENTS FOR ENHANCING MULTIMEDIA FEATURES IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 11/877,875

(22) Filed: Oct. 24, 2007

(65) Prior Publication Data

US 2009/0109213 A1 Apr. 30, 2009

(51) Int. Cl.
*G06T 15/00* (2011.01)
(52) U.S. Cl.
USPC .......................................... 345/419; 715/706
(58) Field of Classification Search .................. 345/419; 715/706
See application file for complete search history.

(56) References Cited

U.S. PATENT DOCUMENTS

| | | | |
|---|---|---|---|
| 4,807,202 A | 2/1989 | Cherri et al. | |
| 4,984,179 A | 1/1991 | Waldern | |
| 5,177,872 A | 1/1993 | Lewis et al. | |
| 5,815,156 A | 9/1998 | Takeuchi | |
| 5,815,586 A | 9/1998 | Dobbins | |
| 6,020,885 A | 2/2000 | Honda | |
| 6,085,256 A | 7/2000 | Kitano et al. | |
| 6,229,533 B1 | 5/2001 | Farmer et al. | |
| 6,281,898 B1 | 8/2001 | Nikolovska et al. | |
| 6,396,509 B1 | 5/2002 | Cheng | |
| 6,452,598 B1 | 9/2002 | Rafey et al. | |
| 6,518,989 B1 | 2/2003 | Ishikawa et al. | |
| 6,704,784 B2 | 3/2004 | Matsuda et al. | |
| 7,036,082 B2 | 4/2006 | Dalrympie et al. | |
| 7,184,038 B2 | 2/2007 | Sowizral et al. | |
| 7,266,616 B1 | 9/2007 | Munshi et al. | |
| 7,801,956 B1 | 9/2010 | Cumberbatch et al. | |
| 2002/0113809 A1 | 8/2002 | Akazawa et al. | |
| 2003/0005439 A1* | 1/2003 | Rovira | 725/37 |
| 2003/0177187 A1 | 9/2003 | Levine et al. | |
| 2003/0187749 A1 | 10/2003 | Peled et al. | |
| 2004/0116183 A1* | 6/2004 | Prindle | 463/42 |

(Continued)

FOREIGN PATENT DOCUMENTS

WO 9509411 A1 4/1995

OTHER PUBLICATIONS

"US Application No. 12120629—Final Office Action", Mar. 29, 2011—33 pages.

(Continued)

*Primary Examiner* — Maurice L McDowell, Jr.
(74) *Attorney, Agent, or Firm* — Garg Law Firm, PLLC; Rakesh Garg; Mark C. Vallone

(57) ABSTRACT

In one embodiment, a method for operating a virtual environment is disclosed. The method can include receiving an interactive virtual universe feed from a network in coordinate format. The method can also include displaying an interactive virtual universe and providing a trigger to a client application responsive to a user interaction. The trigger can change a mode of a user's computer where the computer receives and displays video data or pixel data. Thus, the client machine can display higher quality video. Other embodiments are also disclosed.

20 Claims, 5 Drawing Sheets

U.S. PATENT DOCUMENTS

| | | | |
|---|---|---|---|
| 2004/0193441 A1 | 9/2004 | Altieri | |
| 2005/0143174 A1 | 6/2005 | Goldman et al. | |
| 2005/0166163 A1 | 7/2005 | Chang et al. | |
| 2005/0179685 A1* | 8/2005 | Kake et al. | 345/419 |
| 2005/0193341 A1 | 9/2005 | Hayward et al. | |
| 2006/0121991 A1 | 6/2006 | Borinik et al. | |
| 2006/0129917 A1 | 6/2006 | Volk et al. | |
| 2006/0135261 A1 | 6/2006 | Kinne et al. | |
| 2006/0173985 A1 | 8/2006 | Moore | |
| 2007/0113181 A1 | 5/2007 | Blattner et al. | |
| 2007/0174467 A1 | 7/2007 | Ballou, Jr. et al. | |
| 2007/0192352 A1 | 8/2007 | Levy | |
| 2007/0192674 A1 | 8/2007 | Bodin et al. | |
| 2007/0209011 A1 | 9/2007 | Padmanabhuni et al. | |
| 2007/0220016 A1 | 9/2007 | Estrada et al. | |
| 2007/0225071 A1 | 9/2007 | Van Luchene et al. | |
| 2007/0255807 A1 | 11/2007 | Hayashi et al. | |
| 2007/0265090 A1 | 11/2007 | Barsness et al. | |
| 2007/0265091 A1 | 11/2007 | Aguilar et al. | |
| 2008/0059348 A1 | 3/2008 | Glassman et al. | |
| 2008/0059570 A1 | 3/2008 | Bill | |
| 2008/0090659 A1 | 4/2008 | Aguilar et al. | |
| 2008/0194332 A1* | 8/2008 | Kadikario et al. | 463/42 |
| 2008/0200253 A1 | 8/2008 | Van Luchene et al. | |
| 2008/0207329 A1 | 8/2008 | Wallace et al. | |
| 2008/0248849 A1 | 10/2008 | Lutnick et al. | |
| 2008/0270319 A1 | 10/2008 | Torabi et al. | |
| 2008/0284779 A1 | 11/2008 | Gu et al. | |
| 2008/0306951 A1 | 12/2008 | Rodefer | |
| 2008/0318678 A1 | 12/2008 | Stivoric et al. | |
| 2009/0007186 A1 | 1/2009 | Hartwell | |
| 2009/0017913 A1 | 1/2009 | Bell et al. | |
| 2009/0024943 A1 | 1/2009 | Adler et al. | |
| 2009/0069084 A1 | 3/2009 | Reece et al. | |
| 2009/0094287 A1 | 4/2009 | Johnson et al. | |
| 2009/0100353 A1 | 4/2009 | Cradick et al. | |
| 2009/0109213 A1 | 4/2009 | McDowell | |
| 2009/0112970 A1 | 4/2009 | Dawson et al. | |
| 2009/0124349 A1 | 5/2009 | Dawson et al. | |
| 2009/0132422 A1 | 5/2009 | Booth et al. | |
| 2009/0138906 A1 | 5/2009 | Eide et al. | |
| 2009/0144267 A1 | 6/2009 | Cook et al. | |
| 2009/0144639 A1 | 6/2009 | Nims et al. | |
| 2009/0147003 A1 | 6/2009 | Do et al. | |
| 2009/0158161 A1 | 6/2009 | Gibbs et al. | |
| 2009/0164279 A1 | 6/2009 | Black | |
| 2009/0172570 A1 | 7/2009 | Arcas et al. | |
| 2009/0209335 A1 | 8/2009 | Pearce | |
| 2009/0215433 A1 | 8/2009 | Cavanaugh et al. | |
| 2009/0241039 A1 | 9/2009 | Estevez et al. | |
| 2009/0241126 A1 | 9/2009 | Beggs, Jr. et al. | |
| 2009/0287758 A1 | 11/2009 | Hamilton et al. | |
| 2009/0288001 A1 | 11/2009 | Hamilton et al. | |
| 2009/0319892 A1 | 12/2009 | Wright et al. | |
| 2010/0005424 A1 | 1/2010 | Sundaresan et al. | |

OTHER PUBLICATIONS

Dudeney, Gavin, "Streaming RSS Feeds in World", https://lists.secondlife.com/pipermail/educators/2006-September/002536.html, Sep. 24, 2006.

"What is RSS?", Software Garden, http://rss.softwaregarden.com/aboutrss.html, 2006.

"US Application No. 12120625—office action", Dec. 28, 2009, 13 pages.

"US Application No. 12120625—final office action", Aug. 9, 2010, 14 pages.

"US Application No. 12120629—office action", Dec. 13, 2010, 27 pages.

"US Application No. 12120625—office action", Apr. 6, 2011.

"Animal Crossing Wild World: Instruction Booklet for Nintendo OS", Nintendo 2005, 24 pages.

"U.S. Appl. No. 12/120,629 Office Action", Oct. 6, 2011 ,32 pages.

"U.S. Appl. No. 11/877,875 Final Office Action", Apr. 14, 2011 ,15 pages.

"U.S. Appl. No. 11/877,875 Office Action", Oct. 12, 2010, 12 pages.

"U.S. Appl. No. 12/120,625", Amendment/Req. Reconsideration—After Non-Final Reject, Apr. 21, 2010.

"U.S. Appl. No. 12/120,625", Amendment after final, Dec. 9, 2010.

"U.S. Appl. No. 12/120,625", Amendment After Final or under 37CFR 1.312, initialed by the examiner., Jan. 4, 2011.

"U.S. Appl. No. 12/120,625", Amendment Submitted/Entered with Filing of CPA/RCE, Jan. 10, 2011.

"U.S. Appl. No. 12/120,625", Amendment/Req. Reconsideration—After Non-Final Reject, Aug. 5, 2011.

"U.S. Appl. No. 12/120,625", Final Rejection, Feb. 24, 2012.

"U.S. Appl. No. 12/120,625", Notice of Appeal filed, Jun. 25, 2012.

"U.S. Appl. No. 12/120,625", Amendment/Req. Reconsideration—After Non-Final Reject, Jun. 25, 2012.

"U.S. Appl. No. 12/120,625", Amendment After Final, Oct. 31, 2012.

"U.S. Appl. No. 12/120,625", Notice of Allowance and Fees Due (PTOL-85), Jan. 30, 2013.

"U.S. Appl. No. 12/120,629", Amendment/Req. Reconsideration—After Non-Final Reject, Mar. 11, 2011.

"U.S. Appl. No. 12/120,629", Final Rejection, Mar. 29, 2011.

"U.S. Appl. No. 12/120,629", Amendment Submitted/Entered with Filing of CPA/RCE, Jul. 22, 2011.

"U.S. Appl. No. 12/120,629", Request for Continued Examination (RCE), Jul. 22, 2011.

"U.S. Appl. No. 12/120,629", Amendment/Req. Reconsideration—After Non-Final Reject, Jan. 4, 2012.

"U.S. Appl. No. 12/120,629", Final Rejection, Mar. 14, 2012.

"U.S. Appl. No. 12/120,629", Notice of Appeal filed, Jul. 12, 2012.

"U.S. Appl. No. 12/120,629", Appeal Brief filed, Sep. 12, 2012.

"U.S. Appl. No. 12/120,629", Reply Brief filed, Dec. 21, 2012.

* cited by examiner

ARRANGEMENTS FOR ENHANCING MULTIMEDIA FEATURES IN A VIRTUAL UNIVERSE

FIELD

The present disclosure relates generally to a virtual universe (VU) and more particularly to arrangements for providing multimedia that supports a VU.

BACKGROUND

Operating in a virtual environment utilizing a computer is a pass-time that is gaining popularity. A virtual environment is an interactive simulated environment accessible by multiple users who can interact through an "online" interface that acts as a network client. Users can inhabit and interact in the virtual environment via avatars, which can be two or three-dimensional graphical representations of human type or other icons. Alternately described, an avatar can be a graphical representation that a user can select to represent himself/herself that others can see while in the same virtual environment. An avatar can take the form of a cartoon-like human.

Virtual environments have many different names. For example, a virtual environment can be referred to as a "metaverse," a "3D Internet" a virtual world, and so on referred to herein as a virtual universe (VU). Although there are many different types of virtual environments, there are several features many VUs have in common. For example, many VUs have shared space which is a "universe" that allows many users to concurrently participate in an activity. The VU residents/avatars can traverse, inhabit, and interact with other avatars via 3-D graphics and landscapes. Thus, a VU can be populated by many thousands of residents or avatars. Often, the VU resembles the real world in terms of physics or physical laws, houses, and landscapes, etc.

Many virtual environments also have a graphical user interface (GUI). The GUI can depict the environment or some form of "space" visually, ranging in style from 2D "cartoon" imagery to a more immersive 3D environment. In addition many virtual environments provide immediacy, interactivity, and persistence. Immediacy allows interactions between a user's avatar and the environment to take place in real time. Interactivity with the environment allows users to alter, develop, build, or submit customized content. Persistence provides a continuous environment regardless of whether individual users are logged in.

An agent can be a user's account, upon which the user can build an avatar, and which is tied to the inventory of assets the user owns. A region can be a virtual area of land within the VU, typically residing on a single server. Assets, avatars, the environment, and anything visual can have UUIDs (unique universal identifier) that are associated with geometric data, among other data. The geometric data can be distributed to users as textual coordinates. Textures can be distributed to users as graphics files, which are placed within the boundaries of specified textual coordinates. Effects data can be rendered by the user's client according to the user's preferences and user's device capabilities. Lastly, socialization and/or community features allow and encourage the formation of social groups such as teams, guilds, clubs, cliques, housemates, neighborhoods, etc.

Residents can be personas or representations of the users of the VU, and residents can roam all about the virtual region by walking, driving, flying, or even by teleportation or transportation, which is essentially moving through space from one point to another in the VU, more or less instantaneously. The VU can also include things that do not presently exist in real life.

An avatar can have a wide range of business and social experiences while interacting with the VU. Such business and social experiences are becoming more common and increasingly important in on-line VUs.

There are many different services that provide VUs via the World Wide Web. For example, Second Life, Entropia Universe, The Sims Online, There, and Red Light Center all provide some form of VU, and these service providers have trademark rights in such names. VUs can also provide multi-player online games such as EverQuest, Ultima Online, Lineage or World of Warcraft, and likewise such service providers have trademarks in such name. One popular VU mentioned above available is "Second Life" (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming, exploration, advertising, and travel, as well as real-life simulations in virtual spaces. Virtual environments allow a user or viewer to see text on signs and low-resolution geometric renderings on television screens and movie theater screens. However, such a feature is less than perfect.

SUMMARY

The problems identified above are in large part addressed by the systems, arrangements, methods and media disclosed herein to allow a user in a virtual universe (VU) to move quickly and easily from a presentation in the VU, to a high-resolution media presentation. Thus, a user operating within a VU can further investigate an advertisement or entertainment that is provided in a low-resolution graphics mode in the VU, by conducting an activity or selecting a selectable button on the screen. In response to this user activity, a higher resolution pixel based video feed can be seamlessly provided to the user. The user's machine can load a pixel processing plug-in and a pixel based video feed can be displayed to the user. The disclosed arrangements allows for switching to a higher resolution media mode in both a personal and business VU setting.

In some embodiments, a method for operating a virtual environment is disclosed. The method can include receiving a VU feed from a network, the feed having graphical data. The method can also include displaying an interactive VU in response to the graphical data using a client application. Based on a user action detectable by the client application, the client application can provide a trigger or a request to the network and in return, the network can provide streaming pixel based video to the client application such that the user can view higher quality video. Accordingly, the client application can receive pixel based video data from a multimedia server in response to the trigger and the client application can display the pixel based video data to the user.

In other embodiments, a system is disclosed that includes a server to provide interactive VU graphics to a client application. The system can also include a switch coupled to the server to switch from providing the VU graphics to providing a streaming pixel based video feed to the client application in response to a transmission from the client application. The system can also include a second server coupled to the switch to provide the streaming video to the client application. In addition, the system can provide a monitor module to monitor what is provided to the client application. The system can also include a billing module to invoice an advertiser or subscriber to a video service provider in response to the monitored streaming video provided to the client application. The system can also include a billing module to invoice a client in response to the monitored streaming video.

In yet another embodiment, a machine-accessible medium can be provided containing instructions to configure a processing system, which, when the instructions are executed by a machine, cause the machine to interchange between displaying VU graphics and streaming video. The operations can include displaying an interactive VU, detecting a user action, and providing a trigger to a server array responsive to a user interaction. The operations can also include receiving pixel data in response to the trigger, and displaying the video data.

The operations can also include loading a plug-in at the client location (video decompression/pixel processing) in response to detecting a trigger. The trigger can also make the feed to the client switch from a first server feed to a second server feed and the feed (either feed) can be displayed to the user. When the user selects a change of mode either directly or indirectly, the provider (in the case of advertising) and the user (in the case of downloading a movie or other paid content) can be billed for the displayed video. The system can also include detecting a second trigger and switching back to the graphics feed when the second trigger occurs.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Systems, arrangements, methods and media are disclosed herein to allow a user in a virtual universe (VU) to move quickly and easily from a VU to a full screen video with high-resolution graphics. Thus, a user in a VU can further investigate an advertisement or video that is vague in the VU because it is being provided in a low-resolution graphics mode in the VU. The "further investigation" can be requested voluntary or involuntary via a user action. The user action may be selecting an item or selectable button in the VU (on the screen) or it may be an action such as sitting down near a television screen in the VU or entering a movie theater door in the VU.

When such an event or action occurs, it can trigger a change in the data feed to the user's client application. The feed can change from a VU feed to a higher resolution feed optimized for streaming video, where the feed may not change "perspective" based on user movements such as is the case in a VU environment. This quality streaming video (pixel based) can be seamlessly provided to the user based user actions or user driven events. The disclosed arrangements allow for switching to a higher resolution media mode in both a personal and business VU setting.

Figure 1:
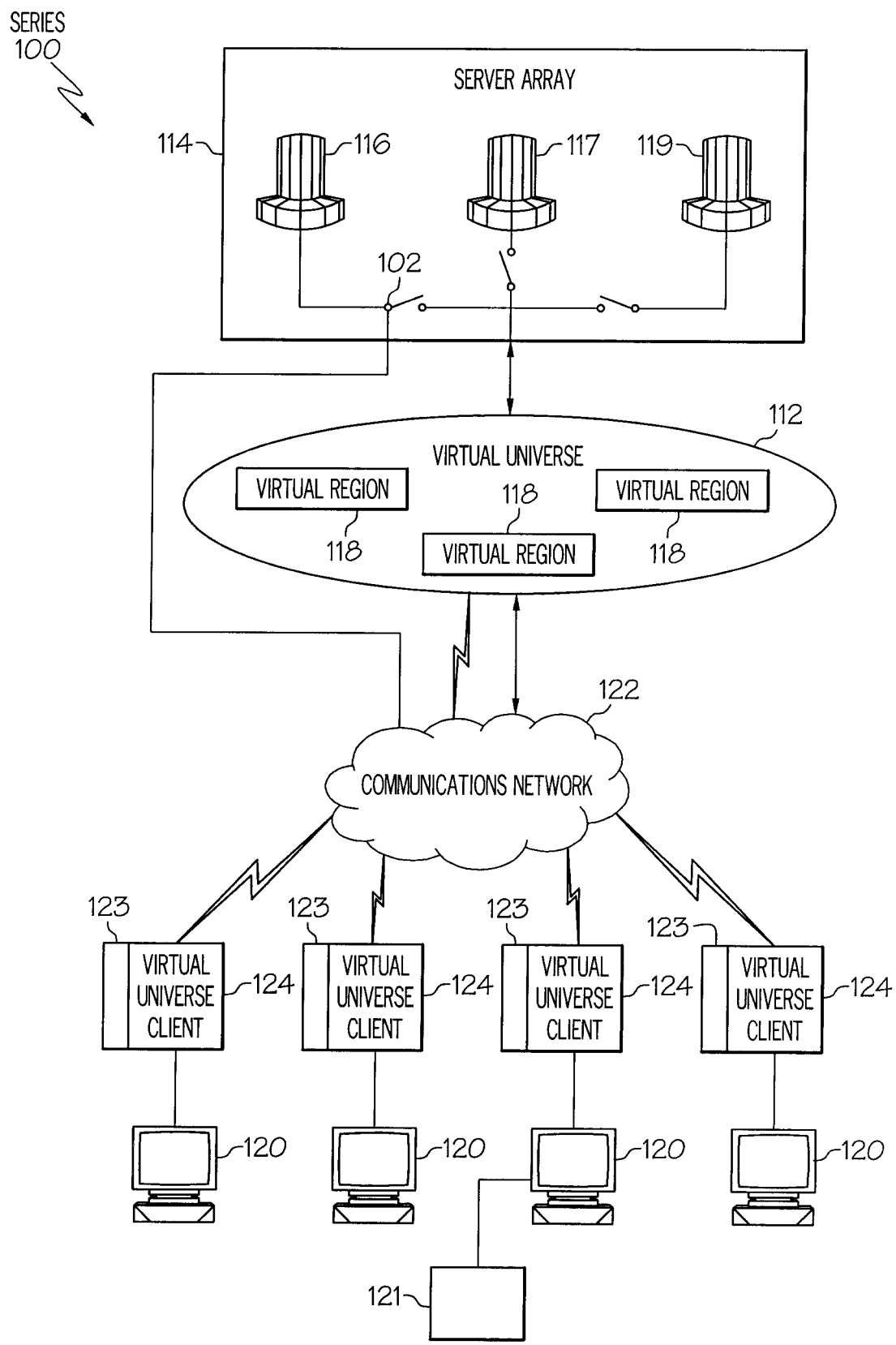
FIG. 1 depicts a high-level block diagram of a network environment.

FIG. 1 is a block diagram depicting a networking environment 100 that can provide a VU 112 for client applications 124. The networking environment 110 can include a server grid, farm or array 114, a VU 112, a communications network 122, VU clients 124, pixel processor/decompressor 123 and computers 120.

The server array or array 114 can include VU (VU) servers 116, multimedia servers 117, monitoring servers 119, and a switch 102. The switch 102 can be utilized to switch servers 116, 117, and 119 that can feed the computers 120. As illustrated, different types of servers, such as 116, 117 and 119 can supply various types of video, graphics and data to, and can monitor output from the client computers 120. Monitoring server 119 can be continuously connected to many components such that it can monitor activities within the server farm 114 and can monitor VU client 124 activities.

In some embodiments, a client computer 120 can request and receive VU graphics from the VU servers 116 and client computer 120 can also request streaming pixel data from the multimedia server 117 where the multimedia server 117 can provide streaming pixel data with a higher pixel resolution to the client computer than the VU server. These feeds can happen consecutively or concurrently.

Accordingly, VU servers 116 can be responsible for managing at least a portion of virtual real estate such as a virtual region 118 within the VU 112. For example, a VU can be a typical massive multiplayer on-line game that can employ thousands of servers to manage all of the virtual real estate. Thus, the number and type of servers illustrated should not be considered limiting to this disclosure. However, as illustrates the content of the virtual real estate, avatars and activities can be managed by VU servers 116. A single VU server 116 can also manage a single virtual region 118 in the VU 112.

Similar to the "real-world", each virtual region 118 within the VU 112 can include items such as living landscapes having things, or objects, or interactive objects such as buildings, stores, clubs, sporting arenas, parks, beaches, signs, billboards, movie theaters, television screens, computers, cities and towns all created by residents of the universe where residents are represented by avatars. A user's avatar can move about the VU much like humans move about their neighborhoods, towns and world.

These examples of items are only illustrative of some things that may be found in a VU or virtual region and thus, the things and objects mentioned are not to be considered as limiting. Furthermore, the number of virtual regions 118 shown is for illustration purposes and there may be many more regions as found in typical VUs. Users operating computers 120 may interact with the VU 112 through a communication network 122 via a VU client 124 that can reside in the computer 120. A VU client 124 may be a standalone application or embedded in another application, such as through a web browser containing a plug-in such as the Sun JAVA Runtime Environment, Adobe Macromedia Flash Player, or similar plug-ins that allow applications to be embedded in a web browser. Sun and Adobe have trademark rights in such names.

The VU client 124 and computer 120 can have an activity monitor 121 that can detect an event of the user or avatar induced action, and based on the event, the activity monitor 121 can send a trigger signal to the switch 102, where the switch 102 can change states and connect the appropriate server (the VU server 116, the multimedia server 117 or the monitoring server 119) to the computer 120. The activity monitor 121 is only shown for one computer 120 but could be coupled to each computer 120.

Thus, based on an event detected by the activity monitor 121 VU client 124 can request to switch the feed or change the communication link to a different server or source for example from the VU server to the multimedia server 117. Accordingly, the content and format of data provided to the computer 120 can be changed based on an event detected by the activity monitor 121 and the display can display a VU in one mode switch to high-resolution pixel based data from the multimedia server 117 and then switch back to a VU feed.

In computer graphics and video images, the pixel resolution is the number of pixels in the display. For example, a picture with 1,024×768 pixels is much sharper, or has higher resolution, than a picture with 640×480 pixels. The total number of pixels is the product of these two numbers and the greater the number of pixels per screen the greater the pixel resolution. High definition television is a generic term that is commonly utilized to describe TV signals having a video format with twice the horizontal resolution and twice the vertical resolution of non high definition television. High definition television can support or display a million or more pixels. A high definition screen can support 1280×720 pixels or 0.92 megapixels.

Monitoring servers 119 can monitor the activity of client applications 120 and multimedia servers 117. In some embodiments monitoring servers 119 can store a title, time, supplier, subscriber, cost etc. of the content provided to client application 120 for billing purposes. In other embodiments, the monitoring server 119 can monitor the activities of the VU client 124 to determine an amount of time that an avatar spends looking at an advertisement or viewing a show or movie, as determined typically by the amount of time an advertisement, show, or movie is being rendered in the VU client 124.

Multimedia servers 117 can be responsible for providing higher pixel resolution than the VU server 116, which can be connected to a library of sections or to external feeds such as a satellite feed. The higher pixel resolution can take many forms and can be provided according to numerous aspect ratio standards such as 4:3 or 16:9, along with any pixel standards, such as 640×480 or 560×226, and any frames per second standards such as 27 or 30, and any compression and codec standards such as XviD, MPEG4 to name a few. MPEG is an industry standard promulgated by the Moving Picture Experts Group and provides standards for compression, decompression and storage of motion video. XviD is an open source MPEG-4 video coding/decoding standard. Pixel processor/decompression module 123 can process pixel data in accordance with many video standards.

Generally, multimedia servers 117 can provide streaming pixel based video, in accordance with many digital video standards. In some embodiments, multi-media servers 117 can store movies, shows, advertisements and other content that can be provided as a video feed to the client applications 124. Multimedia servers 117 can also receive a feed from a clearing house such as Home Box Office, Showtime, Time Warner, etc.

As described above, the disclosed configuration can automatically switch what is displayed on the screen of the computer 120 from an interactive VU to video. In some embodiments the video mode may not provide interactivity to the user, and the video mode may not support the graphical features of a graphical user interface (GUI) such as commonly found in a VU mode. In other embodiments, the video mode can make use of enhanced multimedia controls that are not ordinarily available in a VU client, such as skip, pause, rewind, forward, play, save (such as to save the video stream to the user's local hard drive), change aspect ratio, apply playback transformations (such as brightness, audio altering, colors, speed, etc.), full screen, docked viewing mode (such as Windows Media Player, which can be displayed on the Windows desktop toolbar to allow a miniature view of the video that is visible over any other applications), etc.

The seamless switch to and from the GUI environment (VU to streaming pixel data) can occur responsive to a user or an avatar engaging in an event. For example, the event can be the avatar or the user selecting or approaching an object, such as a representation of a television screen that is visible within a VU 112. In some embodiments, the user can select the object (for example a television screen) using a pointing device such as a mouse, and the screen on the computer 120 can transition from a low quality graphics rendering of VU media to a high quality full screen media presentation. In some embodiments, instead of a full screen mode the television screen in the VU can be enlarged (such as in a pop-up window) to any size, such that a portion of interest on the screen (video) can become much more intelligible to the user while the user still moves about as an avatar in the VU portion of the screen. Such a transition may require the client application 124 to load and use a plug-in that will process streaming pixel based video from the multimedia server 117. In some embodiments, the server array 114 can provide the plug-in or an indicator of what plug-in should be loaded and utilized to decode or decompress the video stream.

Additionally, client application 124 or the server array 114 can store the "location" of the avatar in the VU 112 (possibly as a pointer to a location in the instructions) that the avatar "leaves" and when the media presentation is over, or an event occurs, the client application 124 can resume the same activity or in the same location as the user/avatar was prior to the change in the feed to the client application 124. Such a transition can occur based on numerous events that can trigger a change in mode. For example, a user requesting movement of the avatar can cause a trigger or the completion of a cycle of the video such as the movie coming to a conclusion can also cause the trigger. In some embodiments, high quality graphics or video content can be downloaded to the client application 124 and stored for local playback, and such a playback can be integrated on the screen with VU communications and/or audio.

As stated above, the user selection of an existing media object such as a television screen in the VU 112 could provide a trigger to present some media in a high-resolution format via switching of the switch 102. Different triggers could request different formats where some triggers could request a full-screen and some a partial high resolution screen so that a user can view the material crisply, with as much resolution as possible and without the usual artifacts that are associated with attempts to display high-resolution content within a smaller visual area of a VU. The disclosed arrangements can provide additional value for users or residents with visual handicaps such as those with visual impairments. Furthermore, the disclosed arrangements can offer users a "blended" experience, where streaming conversation can be provided from the surrounding VU 112 to more of a "real-like" situation in a seamless manner. Such streaming conversations can be "overlaid" onto the primary media, thereby simulating theater and other public forum entertainment experiences where noises and utterances from other avatars in the vicinity can be supplied to the user.

It can be appreciated that streaming pixel data can have the same resolution as provided by the VU feed. However, streaming video methods, even those using decompression typically have a faster frame rate than provided by VU clients rate therefore even pixel data with lower resolution will often appear as higher quality video the a high quality VU feed.

Generally, a VU server 119 will send geometric or coordinate data to the VU client 124. Alternately described, a VU server 119 can send data that can be converted and rendered as geometries and textures, and such a method does not provide the same quality viewing as streaming pixel data because it is far less efficient.

In some embodiments, the streaming pixel data can be processed in parallel with the geometry/texture rendering. Thus, both the video decompression/video processing client 123 and the VU client 124 can be operating at the same time where high quality video could be displayed "within" the VU graphics. In some embodiments the display of the pixel data feed could be adjusted according to the avatar relative to the surface or the area reserved for displaying the streaming pixel data. For example, a "virtual television" viewed from an angle other than perpendicular along the horizontal and vertical planes can cause the pixel feed processor client to provide an orthogonal view of the screen.

Figure 2:
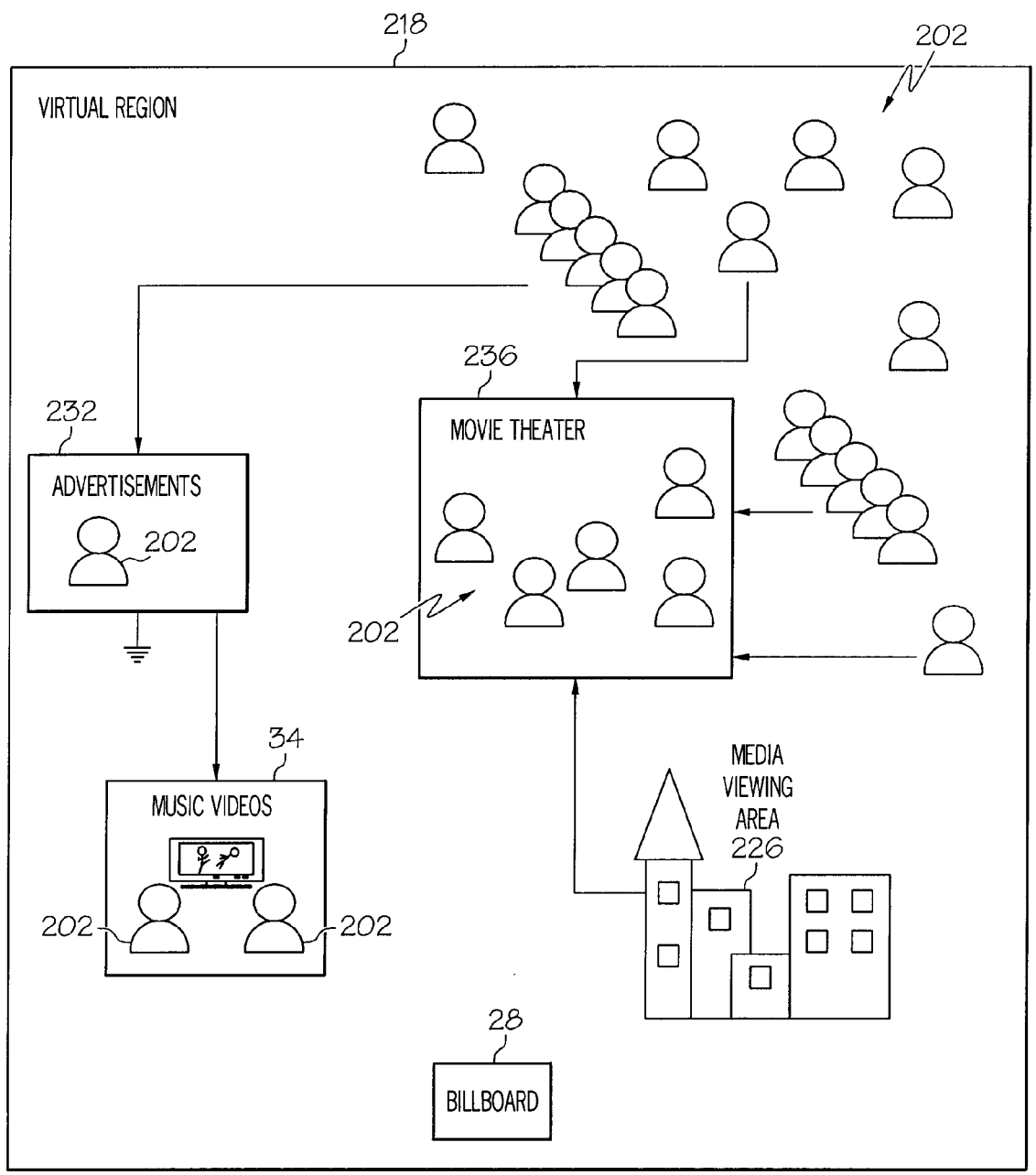
FIG. 2 illustrates a virtual region.

Referring to FIG. 2 a more detailed view of a virtual region 218 in the VU 12 of FIG. 1 is illustrated. The virtual region 118 can include avatars 202 in various concentrations in various locations of the virtual region 218. As an example, the virtual region 218 shown includes a movie theater 236, a media viewing area 226, a television viewing area 234, a billboard 228 and a sign advertisement 232. Each of the locations can have advertisements and/or video viewing locations and the locations shown are for illustrative purposes only as all types of locations would be within the scope of this disclosure. For example, an arcade location, or any location that can have a portable digital video player. Alternately stated, these examples of items or objects in the virtual region 218 are only illustrative of some things that may be found in a virtual region 218. In some embodiments, an avatar 202 can be moving in the virtual region 218 and the avatar 202 can enter media viewing area 226. A place or an item such as movie theater 236 can be in the media viewing area 226, and other avatars can be in the media viewing area 226.

When the user sees a low-resolution video in the media viewing area 226 such as a low-resolution movie playing on a screen, the user/avatar may want to get a better look at what is playing on the screen and actions of the user/avatar can trigger the change to the viewing content. When a user action occurs such as entering a media viewing area 226, sitting down in front of the screen in the movie theater 236, or selecting a selectable button on the graphical user interface, a trigger can change the feed provided by the VU servers 102 such that the transition is seamless. Thus, the client computer 120 can be connected to different feeds depending on the actions of the user/avatar.

As stated above, the activity or events of the avatar or user can be a trigger to change the format of what is displayed to the user. This trigger can be sent to the server network 102 where the appropriate switching can take place. Thus, a user can move from a VU quickly and seamlessly to a full-screen high-definition video mode similar to real life events such as walking into a movie theater where a person's senses are overtaken by a big screen with surround sound.

In some embodiments, a user may move towards a real estate sign or billboard such as billboard 228. If the avatar stops and turns towards the sign a trigger or event could occur where the user is provided with improved quality graphics or video that makes the video or sign more legible or intelligible. Additional content (possibly just not visible with such low resolution) could also be provided when such an event is triggered. In some embodiments advertisers such as a seller of virtual real estate could then be automatically billed for advertisements that are provided to others. Thus, a user in a VU can further investigate an advertisement or entertainment "snippet" that is provided in a low-resolution graphics mode in the VU by any action including an implied interest in some content that is in low resolution. Advertisers may provide the additional advertisement from a feed that is different from the VU feed and advertisers could be billed for such advertising time. Likewise, a user could be billed by a media provided when the user views the full screen entertainment much like the "Pay Per View" systems in existence.

Figure 3:
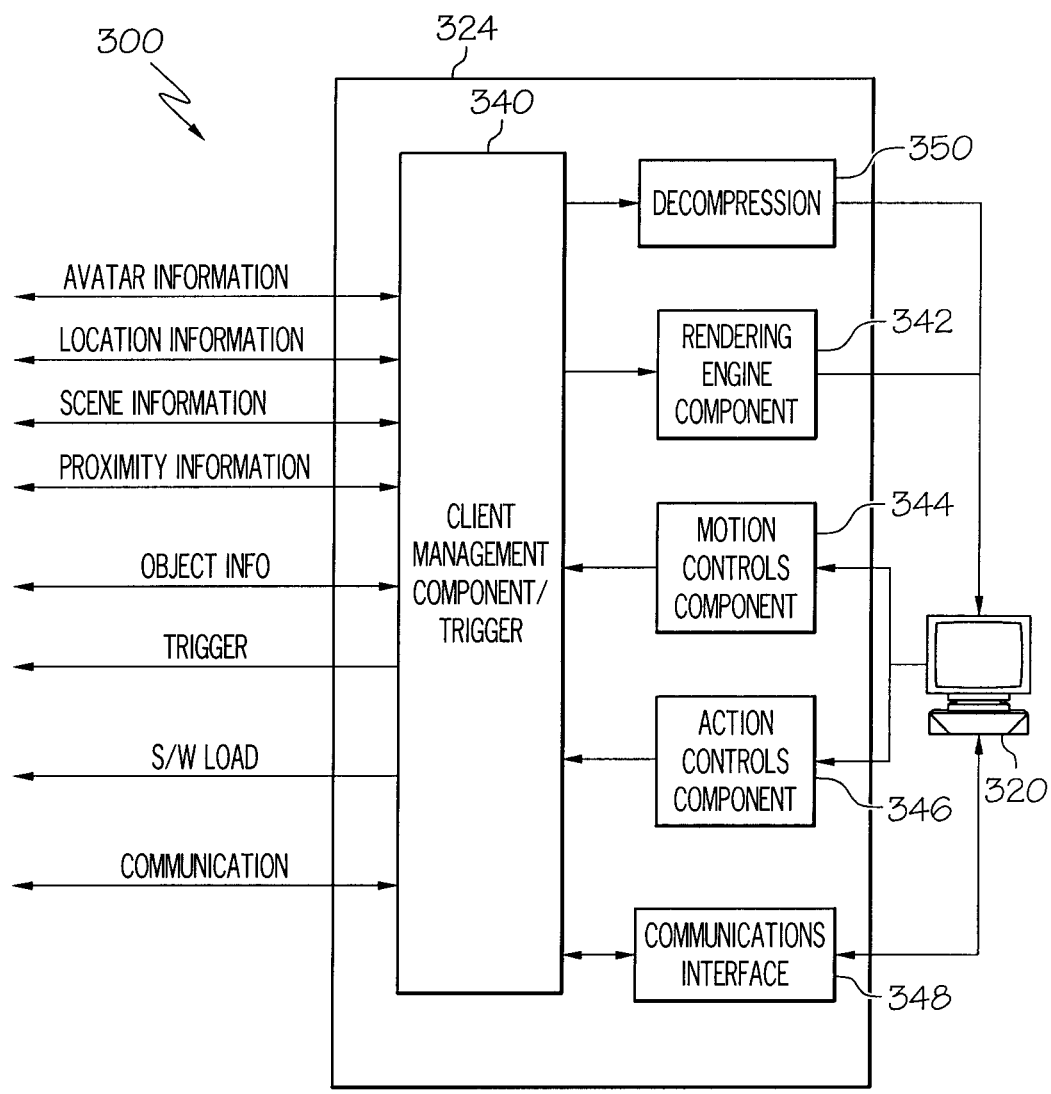
FIG. 3 depicts a client side of the networking environment.

FIG. 3 depicts a more detailed view of a VU client such as the one described in FIG. 1. Although not expressly shown via interconnecting lines, all of the components shown can be configured to and can interact with each other. The components that are shown as being interconnected are illustrated in that manner to convey the close interactions that can exist between these components.

The VU client 324 depicted can enable users to interact via a computer with a VU and servers via a network. The VU client 324 can include a client management component 340, which manages actions, movements and communications made by a user through computer 320. The client management component 340 can, based on user actions or input, trigger a change in the feed to the computer 320 from a user interactive GUI to streaming video. Such a trigger can also activate the loading of a plug-in to run on the computer 320 and can change the feed from the communications interface. The client management component 340 can also accept information received from the VU from the server array of FIG. 1.

A rendering engine component 342 can enable the user of the computer 320 to visualize his or her avatar within the surroundings of the particular region of the VU 312 that it is presently located. A motion controls component 344 can enable the user to make movements through the VU. In one embodiment, movements through the VU can include for example, gestures, postures, walking, sitting down, standing to view an item, entering a room etc.

An action controls component 346 can enable the user to perform actions in the VU, particularly an action that shows a user's interest in seeing higher quality viewing or additional information while in the VU. The actions detected by the action control component 346 could be a direct action such as a point and click input from a pointing device, or an indirect action where interest can be assumed by the action controls component 346. Such an indirect action could include standing in front of, and facing an item such as a video screen, sitting down facing a video screen, walking towards a screen, reaching out to touch a screen, opening a door or entering a doorway, or any real world equivalent the shows an interest in "content" provided in the VU.

For example, the action control component 346 may detect if the user enters a virtual movie theater or sits in front of a screen. In such a situation the client management component 340 can trigger an event that can change the feed from a VU feed to a streaming video feed, and the user can then be provided with full screen high definition video, such that the user feels like they are actually at a movie theater or sitting in front of the television. Further, many different user actions can trigger a shift from the VU resolution to higher pixel resolution feed. The actions of the user that can start the streaming video can come in many forms as the actual implementation that a user can conduct in the VU and are not limiting.

The client management component 340 can receive proximity information, which contains information on what the user's avatar is near and object information such as the existence of a viewing screen. The proxy information can include what objects are nearby the user's avatar and what physical position the avatar assumes (e.g., postures, movements, directions etc.), and based on the user's actions, triggers can be made by the client application. Movement commands and action commands can be generated by the client application and these commands and proximity information can be sent to the server array via the client management component 340. The commands can control a switch that switches different servers into or out of the network based on user actions to move from the VU mode to the streaming video mode and back.

The decompression pixel processing component 350 can receive pixel based data and can process the data such that it can be displayed on a screen. As described above, decompressor/pixel processing component can decompress streaming pixel data and perform other pixel processing features. The decompression could be performed in accordance with many existing video and audio compression/decompression standards.

Further, the server array via the communications interface 348 can transmit audio in stereo or surround sound at varying bitrates, and video in varying encoding standards. The communications interface 348 can enable a user to communicate with other users of the VU 312 through modalities such as chatting, instant messaging, gesturing, talking and email.

To facilitate the quality of video that can be displayed to a user, a client augmentation may be loaded into the computer 320. The augmentation to the VU client management component 340 can allow residents of the VU to request a high quality full screen rendering for streaming media. In some embodiments, a user can select objects in the VU using the computer 320, and in response to the user selection, a routine or algorithm can be called by the client management component 340 via a software load and then the algorithm can be loaded into the client computer 320. This processing algorithm can execute the video or high quality graphic on the computer 320. The user input to the computer 320 for such a change in format can be accepted via a device such as a mouse or a keyboard (not shown). In addition, user input can be accepted as an input combination to display to the user a "context" menu for the selected object. The "context" menu can display actions that are available and "appropriate" for the selected item. For example, a user may choose from a full screen mode, a pop-up mode, a quarter page mode, etc.

A context menu can also have a selection that has an action to request or deny media to be streamed and a selection of the format desired such as full screen high quality or a variation thereof. After such a selection, the streaming video can take the user to a perspective (on the screen of the computer 320) where the (first person) avatar is no longer visible on the screen and the video is provided "through the eyes" of the avatar. Analogously, the client management component 340 can provide a "zoom in" feature such that the user can zoom in on a media hot spot automatically transitioning the user to the high quality media mode. Conversely, a certain degree of "zoom out" from that hot spot could serve as an indication that the user wants to interact with the surrounding virtual environment, and could likewise serve as a trigger mechanism to stipulate "legacy" viewing techniques of the media. Such an action could change the feed from the servers or the network to a hybrid mode (i.e. a partial feed from the media server, especially where the feed is a lower quality streaming video, and a partial feed from the VU servers). The client can specify an identifier that identifies the media that can be streamed. In addition the client management component 340 can specify a resume point that can be utilized by the VU server to resume the VU when a switch back to the VU is desired.

The actual implementation and possible variations and combinations to select the VU mode, the streaming video mode and the hybrid mode can take many forms where such different forms should not be considered as limiting this disclosure. The creator/designer of a region can designate how a user can interact in a particular region and what interactions automatically change the mode. The creator/designer can make the interaction with the user such that the screen controlled by the client management component 340 (such as a GUI) can automatically transition from a low quality low-resolution graphics mode to a higher quality streaming video rendering mode.

Figure 4:
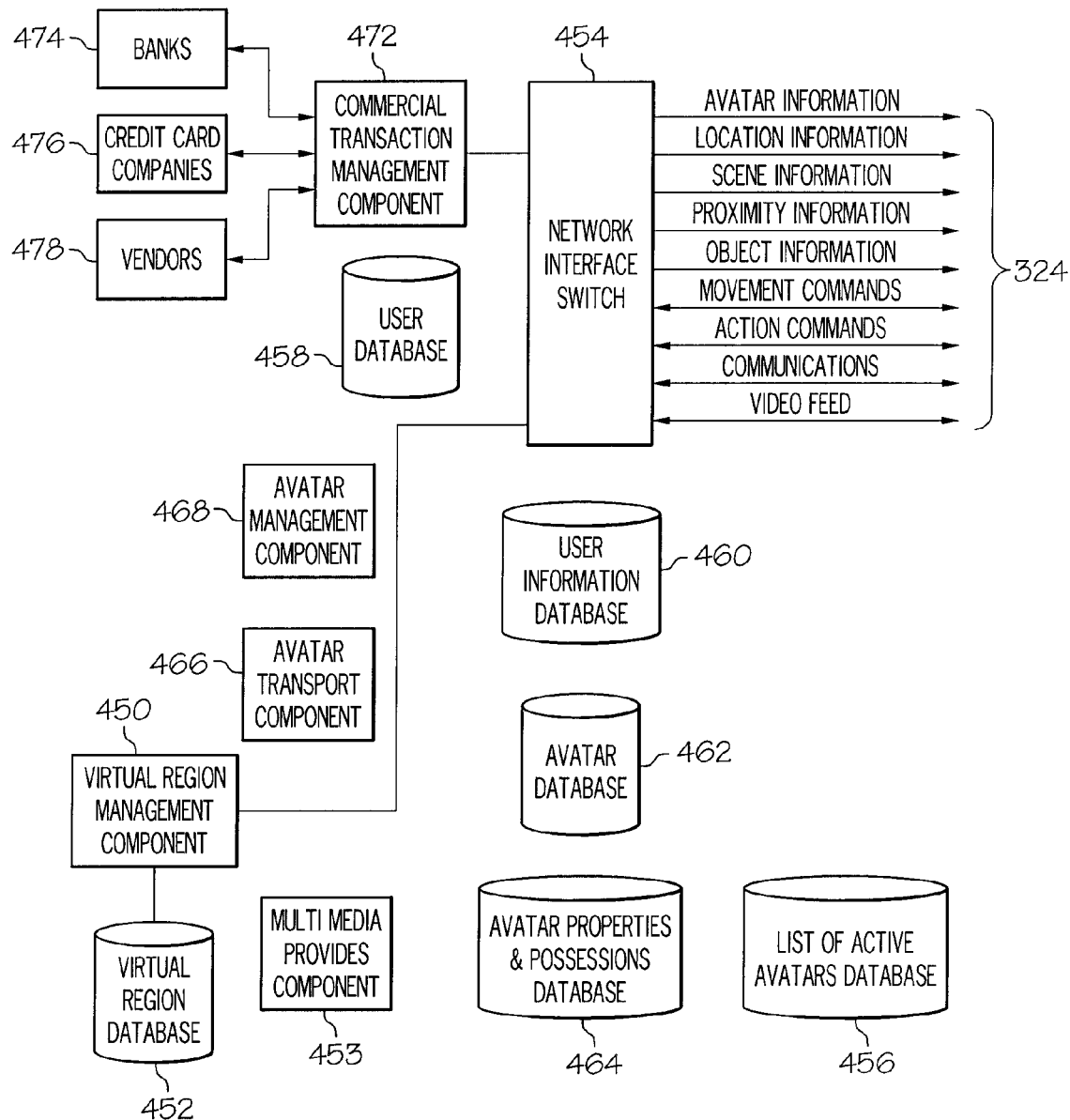
FIG. 4 depicts a server side of the network environment.

FIG. 4 shows a more detailed view of some of the functionalities provided by the server array 14 shown in FIG. 1. In particular, FIG. 4 shows a virtual region management component 450 that can manage a virtual region, a multimedia management component 453, and a commercial transaction management component 472. In particular, the virtual region management component 450 can manage what happens in a particular region such as the type of advertisement or video. The multimedia provider component 453 can manage video and audio such as streaming video and surround sound provided to client applications. The commercial transaction management component 472 can manage economic aspects of the network such as billing clients and billing advertisers and accepting payment.

A virtual region database 452 can store economic based information. In one embodiment, for very large VUs, one server 416 may be responsible for managing one particular virtual region 418 within the universe. In other embodiments, it is possible that one server 416 may be responsible for handling one particular island within the virtual region 118.

A network interface 454 can enable the server components 472, 453, and 450 to interact with the VU client 324 residing on a computer. In particular, the network interface 454 can receive data regarding avatar activities and other user input from an input device that the system uses to invoke a trigger to provide either streaming video or regular VU mode in at least a portion of the screen on the client application.

In return, the commercial transaction management component 472 can invoice and receive payment from advertisers and clients. In some embodiments, the disclosed arrangements can provide a business method that performs the processes disclosed on a subscription, advertising, and/or fee basis. A service provider can create, maintain, support, etc., a computer infrastructure, such as the servers disclosed, that perform the disclosed processes for one or more customers. In return, the service provider can receive payment from the customer(s) under a subscription and/or fee agreement and/or the service provider can receive payment from the sale of advertising space to one or more third parties or a multi-media provider can invoice subscribers.

There are several different databases for storing information. In particular, database 456 can contain a list of avatars that are on-line in the VU 412. Databases 458 and 460 can contain information on the actual human users of the VU 412. In some embodiment, database 458 can contain general information on the users such as names, addresses, interests, ages, etc. Database 460 contains more private information on the users such as email addresses, billing information (e.g., credit card information) for taking part in transactions. Databases 462 and 464 contain information on the avatars of the users that reside in the VU 412. In some embodiment, database 462 contains information such as all of the avatars that a user may have, the profile of each avatar, avatar characteristics (e.g., appearance, voice and movement features), while database 464 contains an inventory listing properties and possessions that each avatar owns such as houses, cars, sporting equipment, appearance, attire, etc. Databases 458-464 may contain additional information if desired. Although the above information is shown as being stored in databases, other means of storing information can be utilized.

Because a typical VU can have an economy, the transaction management component 472 can have functionalities that are configured to manage the economy of the VU. In some embodiments, the VU 412 can have their own currency that users pay for with real-life money. The users can then take part in commercial transactions for their avatars through the universe economy management component 470. In some instances, the user may want to take part in a commercial transaction that benefits him or her and not their avatar. In this case, a commercial transaction management component 472 can allow the user to participate in the transaction. For example, while walking around a commercial zone, an avatar may see a movie that he or she would like to watch and not their avatar. In order to fulfill this type of transaction and others similarly related, the commercial transaction management component 472 can interact with banks 474, credit card companies 476 and vendors 478 to facilitate such a transaction.

In some embodiments, the streaming video can contain advertising provided by the multimedia provider component 453. The user can select or be automatically provided with such high-resolution advertising media, and this activity can be recorded by the commercial transaction management component 472. The amount of advertising provided to a client application can be monitored and the VU service provider can utilize this data to charge fees for advertisers via the activities recorded by the commercial transaction management component 472. The provider of the VU or a third party service provider could offer this monitoring tool as a service by performing the functionalities described herein. In some embodiments, the provider of the VU service or the third party service provider can create, deploy, maintain, support, etc., the advertising data. When entertainment type videos such as pay per view videos are provided by the service provider the VU provider can invoice the user for such services via the monitoring and billing features of the commercial transaction management component 472 and the user information databases 460.

In some embodiments, the multimedia provider component 453 can provide a media playback transition where the media feed can start or stop automatically. For example, an avatar may enter a media room and interact with other avatars. As soon as the media begins to play, the user can be transitioned to a high quality media mode via an interaction between the avatar management component 468 and the multimedia provider component 453. Upon completion of the media feed from the multimedia provider component 453, the user can be transitioned to lower quality VU interaction mode provided by the virtual region management component 450.

In other embodiments, the avatar management component 468 can transition the mode (streaming video to VU) based on a nearby avatar activity or transition. A user may be removed from high quality mode into lower quality VU interaction mode when a "friend" avatar enters a predefined area defined by a radius around the avatar. Such a transition may be provided by the avatar database, the list of active avatars database 456, the avatar management component 468 and the avatar transport component 466. Friend avatars may be declared by the user or may be inferred from previous interactions and such information can be stored in the user database 458 or the user information database 460. If the "visiting" avatar leaves the radius, as defined in the avatar management component 468, the user may automatically transition to the higher quality mode.

In some embodiments, the transition between modes can come from a generic trigger mechanism that is unrelated to user activity. Thus, any event that is internal or external to the VU, which can be detected by the network interface 454 via a communication line, may trigger a switch to a different mode. Examples of external triggers can include, but are not limited to stock market fluctuations, impending detected VU server crashes, a friend entering the VU, etc. Such events could be utilized to provide the trigger to transition from VU mode to streaming video mode or to a hybrid mode.

In some embodiments, the streaming video can be provided by the virtual region management component 450 or VU servers. In these embodiments, the virtual region management component 450 can remain as the feed or source during the high quality feed or high quality rendering of the streaming video. Such a feed can originate from the virtual region database 452. This may occur when a short media presentation is selected such as a short advertisement or a high quality graphic. Upon user requests, the client application can also communicate a preference to management components 450 and 453 for a transition from "in-world" or VU media, to higher quality viewing. If the management components 450 and 453 can accommodate the request, a response can be returned to the client via the communications line of the network interface 454, indicating that such a request can be accommodated by one of the management components 450 or 453.

In some embodiments, the GUI provided by the client application can transition from a VU server feed from the virtual region management component 450 to a feed from a dedicated media server as controlled by the multimedia provider component 453. In this embodiment, the virtual region management component 450 can instruct the client application to prepare to receive high quality streaming media from an external server such as contained in the multimedia provider component 453, which is dedicated to provide the streaming media. The client application can send a request for high quality media to the network interface/switch 454 that can make a decision and locate an appropriate external/dedicated server, which may be part of the multimedia provider component 453. Included in such a request via the communications line can be a resume point in the VU code where the location and activity of the avatar can be resumed when the multimedia feed is terminated. Such a location in the algorithm could be stored in the avatar management component 468.

The resume point in the code could be determined and stored prior to the transition request. Upon completion of the transition request, the incoming high quality stream can be directed to, or transmitted to the user's computer.

In some embodiments, a VU server in the virtual region management component 450 can provide the switching control to place a client in a higher pixel resolution feed mode. A client application can contain built-in algorithms to decompress, process and display the high quality pixel data received from the virtual region management component 450 or the multimedia provider component 453. Methods to display high quality content on the client application can reside within a VU application. For example, the VU client application may allow a web browser that includes the JAVA Runtime Environment [JavaScript is incapable of displaying multimedia except the equivalent of the VU mode, but the JRE is capable of multimedia applets], or a video player such as the Windows Media Player or Apple QuickTime to process the streaming video.

In some embodiments, the video can come from an external application, where the VU client can load an external application, such as Windows Media Player to display high quality content. Windows is a registered trademark of Microsoft Corporation. Depending on the implementation, the external application may be invoked in its own window or may be displayed within the VU client application in a full screen mode using an application programming interface (API) calls or other methods.

In yet other embodiments, a server augmentation process can be utilized. A server in the virtual region management component 450 can be enabled to support the transition in modes by supporting both modes. In some embodiments, upon a request from the VU client, the VU in the virtual region management component 450 may start streaming higher quality content, such as capable of displaying in "full screen" mode on a standard computer without noticeable "artifacting." Artifacting generally is distortion that is introduced into audio or video by the compression algorithm. Compressed video and images may have stray pixels (often white dots) that were not present in the original image. The most common example of artifacting is "pixilation," where individual pixels or groups of pixels produce a blocky image.

The client application can execute many different media types. The media may encompass any multimedia application including sounds, movies, business presentations such as a Power-point application and virtual white boards. The disclosed arrangements can provide many types of transitions. The type of transition can be user selectable. The client can permit seamless toggling between video streaming mode and VU graphics mode. For example, when a user can select an item on the graphical user interface, possibly via a mouse gesture, or possibly a spoken command. Such toggling or switching of the type of feed can be implemented natively if the high quality presentation is part of the VU client software or via API calls if an external program is used for high quality presentation.

The system can also provide a flexible communication channel. When a user is in high-resolution mode or "full-screen" mode, the user may receive communications that are appropriate for the requested mode. For example, if the user is viewing a movie, chat messages sent to the avatar may appear in the high-resolution viewer. Such messaging may be implemented natively if the high quality presentation is part of the VU client software or via API calls if an external program is used for high quality presentation. Integration of chat with high quality media viewing can be implemented as is accomplished by Microsoft's XBOX-360. Some embodiments may opt to overlay the media with information about external and internal VU events. For example, the entrance of an avatar known to the user the same room may trigger a "pop-up" or "screen crawl" informing the user of the avatar's entrance. Other example notifications include, but are not limited to: severe stock market fluctuations, impending media server shutdown or maintenance. Additionally, some embodiments may opt to overlay nearby avatar chats, perhaps as a "screen crawl" on top of the media. Other embodiments may convert the chats to sound using known text to speech method and overlay the sound on the media.

In some embodiments, the client application can provide local storage. In these embodiments, a server may not stream high quality media, but rather the high quality media can be stored locally at the user's machine or at the VU client. The media could also be encrypted and protected by various Digital Rights Management (DRM) algorithms to prevent redistribution to unauthorized users. The media may optionally be viewable during downloading using technology known as progressive downloading. Some embodiments may require payment for local storage. If payment needs to be levied as a result of this saving to a local storage, the system and method here may levy a payment and reimburse the content provider.

Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage devices.

Figure 5:
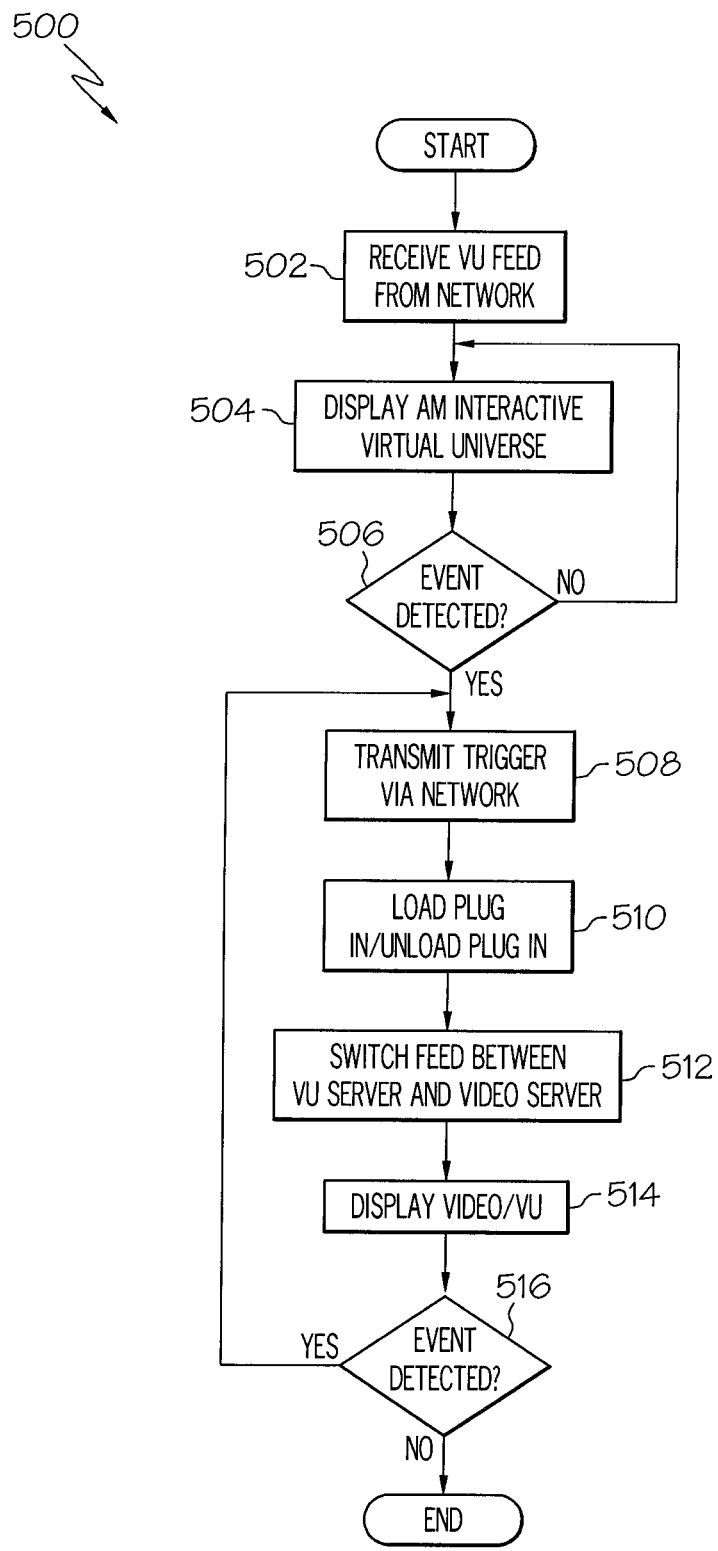
FIG. 5 is a flow diagram providing a method for switching between a VU feed and a streaming video feed.

Referring to FIG. 5 a flow diagram 500 is illustrated. As illustrated by block 502, a VU feed can be received by a client application from a network. The feed can be displayed on a graphical user interface that provides some form of user interaction. The feed can be displayed with user selectable buttons where the display provides an interactive VU as illustrated by block 504.

As illustrated by decision block 506, it can be determined if a user event is detected. As described above, the user event can be a direct/voluntary action such as a selection of a selectable button, an indirect, involuntary action such as walking into a movie theater or an unrelated event such as another avatar entering the user's avatar's space. When a user event is detected then the client application can create and transmit a trigger that requests a mode change as illustrated by block 508. The mode change may be a high quality video or graphics feed where the resolution of the feed changes and the interactivity with the displayed feed changes as illustrated by block 514. In response to the trigger, the client application can load a plug-in that can process the data or video provided in the new mode as illustrated by block 510. For example, a JAVA Runtime Environment or a media player can be loaded by the client machine.

The feed or provider of the service to the client application can change based on the trigger and the mode of operation of the client machine can change to accommodate the new format supplied by the network. The requested feed of the newly selected mode can be displayed as illustrated by block 514. It can be determined if an event is detected such as a voluntary event, an involuntary event or an unrelated event as illustrated by block 516. If no event is detected the process can end. If an event is detected then a trigger can again be generated and sent to the appropriate system components.

An implementation of the process described above may be stored on some form of computer readable storage device. A computer readable storage device can be any available storage device that can be accessed by a computer. "Storage devices" include volatile and non-volatile, removable and non-removable storage devices implemented in any method or technology for storage of information such as computer readable instructions, data structures, program modules, or other data. Storage devices includes, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage devices which can be used to store the desired information and which can be accessed by a computer.

Reference to particular configurations of hardware and/or software, those of skill in the art will realize that embodiments of the present invention may advantageously be implemented with other equivalent hardware and/or software systems. Aspects of the disclosure described herein may be stored or distributed on computer-readable storage devices, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable storage device providing program code for use by or in connection with a computer or any instruction execution system. For the purposes of this description, a computer-usable or computer-readable storage device can be any apparatus that can contain or store the program for use by or in connection with the instruction execution system, apparatus, or device.

The storage device can be an electronic, magnetic, optical, electromagnetic, infrared, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this document that the present disclosure contemplates methods, systems, and media that provide different modes related to a VU. It is understood that the form of the invention shown and described in the detailed description and the drawings are to be taken merely as examples. It is intended that the following claims be interpreted broadly to embrace all the variations of the example embodiments disclosed.

What is claimed is:

1. A method for operating a virtual environment, the method comprising the steps of:
   a computer receiving a virtual universe feed from a network, the virtual universe feed having coordinate data;
   the computer displaying an interactive virtual universe;
   the computer detecting an avatar engaging in an activity in the interactive virtual universe;
   the computer determining to receive streaming pixel data based on the activity of the avatar in the interactive virtual universe;
   the computer receiving the streaming pixel data via the network responsive to the determining; and
   the computer transitioning between displaying the interactive virtual universe and displaying the streaming pixel data, the transitioning further changing a perspective of display such that the streaming pixel data is displayed from the avatar's perspective in the interactive virtual universe.

2. The method of claim 1, further comprising the computer loading a pixel processing plug-in response to the determining.

3. The method of claim 2, further comprising the computer concurrently running a virtual universe client and the pixel processing plug-in to display the streaming pixel data within virtual universe graphics.

4. The method of claim 1, wherein the computer transitioning between displaying the interactive virtual universe and displaying the streaming pixel data comprises the computer switching from a first server feed to a second server feed to display the streaming pixel data full-screen.

5. The method of claim 1, further comprising the computer monitoring the displayed video and invoicing responsive to the monitoring.

6. The method of claim 1, further comprising the computer detecting a trigger and switching to a feed with the coordinate data.

7. The method of claim 6, wherein the trigger is unrelated to a user action.

8. The method of claim 1, further comprising the computer decompressing the streaming pixel data.

9. A computer system for operating a virtual environment, the computer system comprising:
   one or more processors, one or more computer-readable memories and one or more computer-readable tangible storage devices;
   program instructions, stored on at least one of the one or more storage devices for execution by at least one of the one or more processors via at least one of the one or more memories, to provide interactive virtual universe graphics of an interactive virtual universe to a client application on a client computer; and program instructions, stored on at least one of the one or more storage devices for execution by at least one of the one or more processors via at least one of the one or more memories, to switch from providing the interactive virtual universe graphics to providing a streaming pixel data to a second client application on the client computer in response to receiving a transmission from the client computer, and wherein the program instructions to switch change a perspective of display such that the streaming pixel data is displayed from the avatar's perspective in the interactive virtual universe.

10. The computer system of claim 9, further comprising program instructions, stored on at least one of the one or more storage devices for execution by at least one of the one or more processors via at least one of the one or more memories, to provide the streaming pixel data to the client application.

11. The computer system of claim 10, further comprising program instructions, stored on at least one of the one or more storage devices for execution by at least one of the one or more processors via at least one of the one or more memories, to monitor the streaming pixel data provided to the second client application.

12. The computer system of claim 11, further comprising program instructions, stored on at least one of the one or more storage devices for execution by at least one of the one or more processors via at least one of the one or more memories, to produce an invoice in response to the monitored streaming pixel data.

13. The computer system of claim 12, wherein the invoice is produced for one of an advertiser or a user.

14. The computer system of claim 9, further comprising program instructions, stored on at least one of the one or more storage devices for execution by at least one of the one or more processors via at least one of the one or more memories, to accept user input via a user interface.

15. A computer program product for configuring a processing system, the computer program product comprising:

one or more computer-readable tangible storage devices;
program instructions stored on at least one of the one or more storage devices, to display an interactive virtual universe in response to a coordinate data feed;
program instructions stored on at least one of the one or more storage devices, to load a pixel data processing plug-in;
program instructions stored on at least one of the one or more storage devices, to receive pixel data; and
program instructions stored on at least one of the one or more storage devices, to transition between displaying the interactive virtual universe and displaying the pixel data, wherein the program instructions to transition change a perspective of display such that the pixel data is displayed from the avatar's perspective in the interactive virtual universe.

16. The computer program product of claim 15, further comprising program instructions, stored on at least one of the one or more storage devices, to decompress the pixel data.

17. The computer program product of claim 15, wherein the program instructions to transition switch from a first server feed to a second server feed.

18. The computer program product of claim 15, further comprising program instructions, stored on at least one of the one or more storage devices, to store data associated with the displayed pixel data.

19. The computer program product of claim 15, further comprising program instructions, stored on at least one of the one or more storage devices, to bill one of users or providers of the displayed pixel data.

20. The computer program product of claim 15, further comprising:

program instructions stored on at least one of the one or more storage devices, to make a determination to receive the pixel data responsive to detecting an avatar engaging in an activity in the interactive virtual universe.

* * * * *